Sept. 18, 1962     A. F. MANZ ET AL     3,054,884
POWER SUPPLY FOR ELECTRIC WELDING
Filed March 9, 1960     9 Sheets-Sheet 1
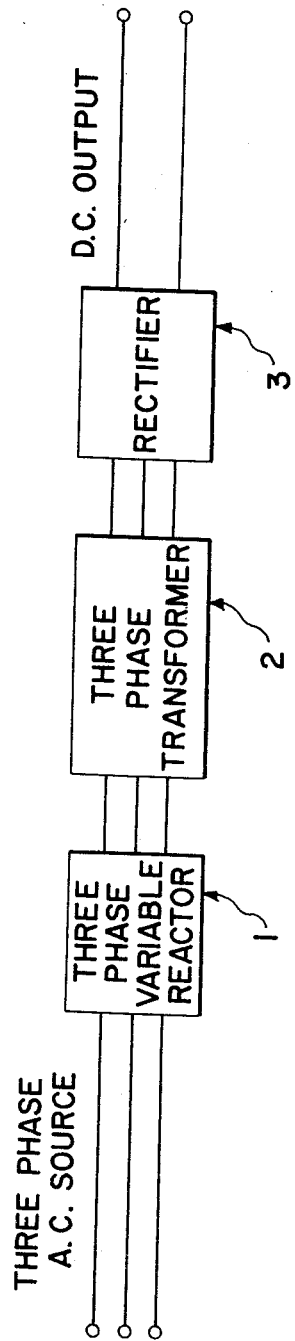
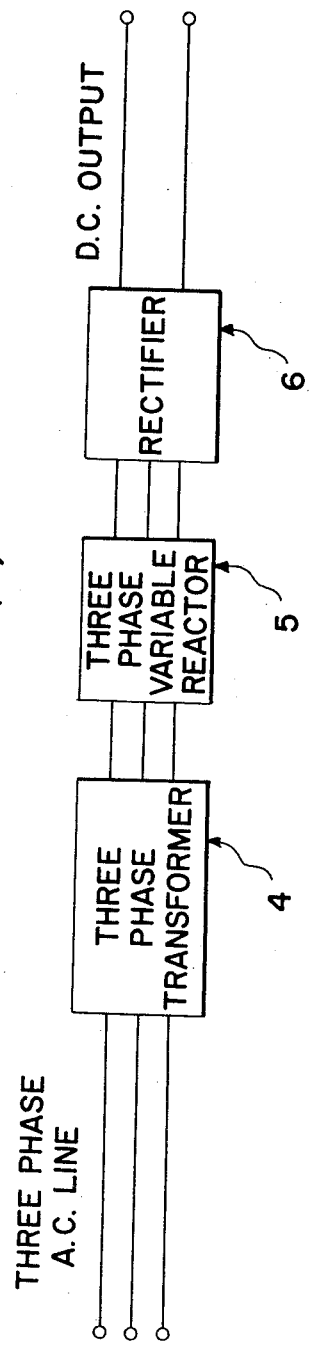
INVENTORS
AUGUST F. MANZ
CHARLES HOPKINS
DEWAYNE B. PETERSON
BY Barnwell R. King
ATTORNEY

INVENTORS
AUGUST F. MANZ
CHARLES HOPKINS
DEWAYNE B. PETERSON

BY Barnwell R. King
ATTORNEY

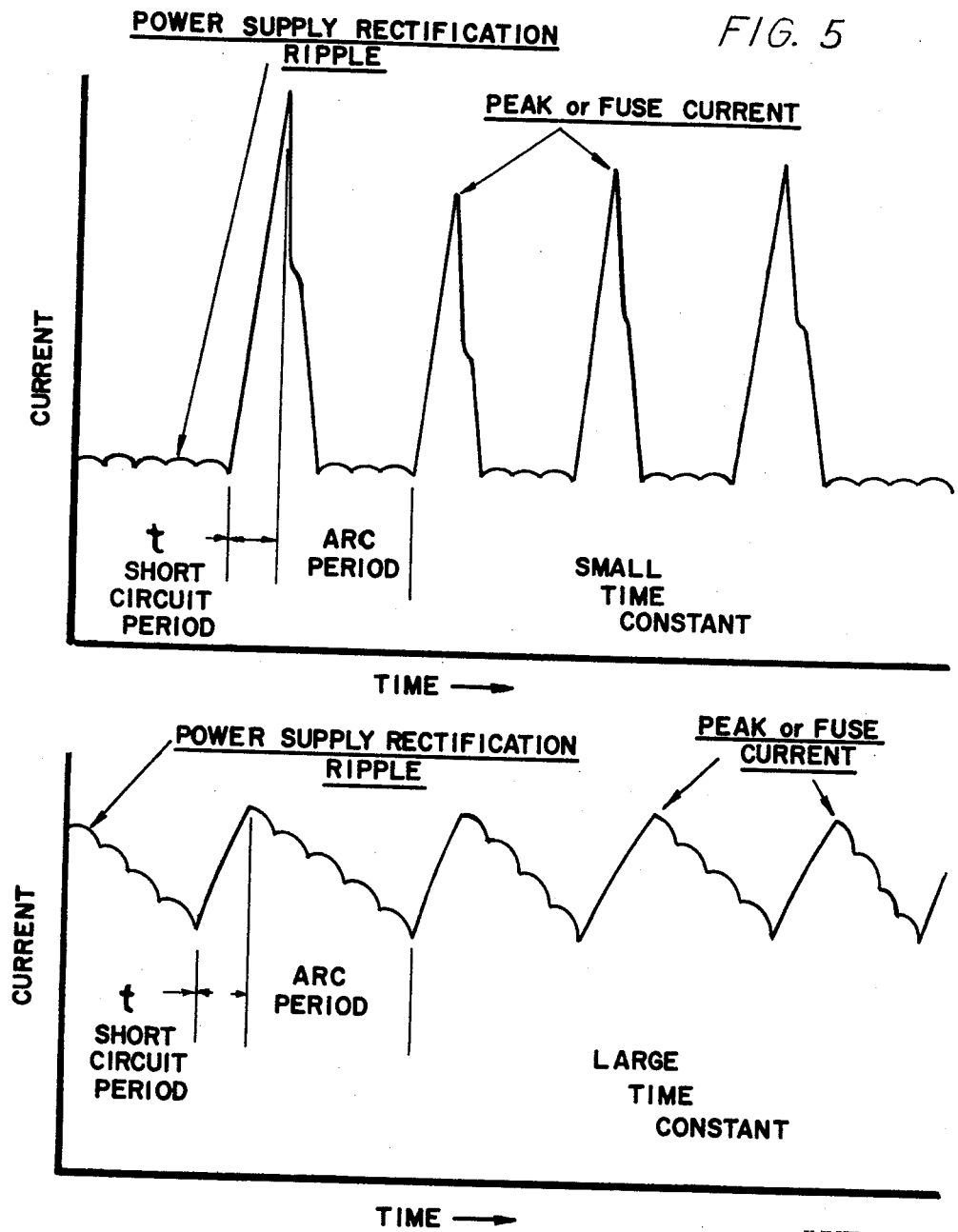

Sept. 18, 1962    A. F. MANZ ET AL    3,054,884
POWER SUPPLY FOR ELECTRIC WELDING
Filed March 9, 1960    9 Sheets-Sheet 4

SHALLOW PENETRATION

DEEP PENETRATION

SPATTER

PROMINENT FREEZE LINES

SMALL TIME CONSTANT

LACK OF SPATTER

MINIMUM FREEZE LINES

LARGE TIME CONSTANT

INVENTORS
AUGUST F. MANZ
CHARLES HOPKINS
DeWAYNE B. PETERSON

BY Barnwell G. King
ATTORNEYS

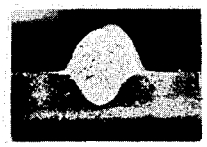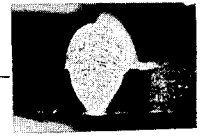
FIG. 9a    NOTE CHANGE IN PENETRATION    FIG. 10a

NOTE CHANGE IN SURFACE APPEARANCE DUE TO THE REDISTRIBUTION OF ELECTRICAL ENERGY
SMALL TIME CONSTANT    LARGE TIME CONSTANT
FIG. 9    FIG. 10
INVENTORS
AUGUST F. MANZ
CHARLES HOPKINS
DeWAYNE B. PETERSON

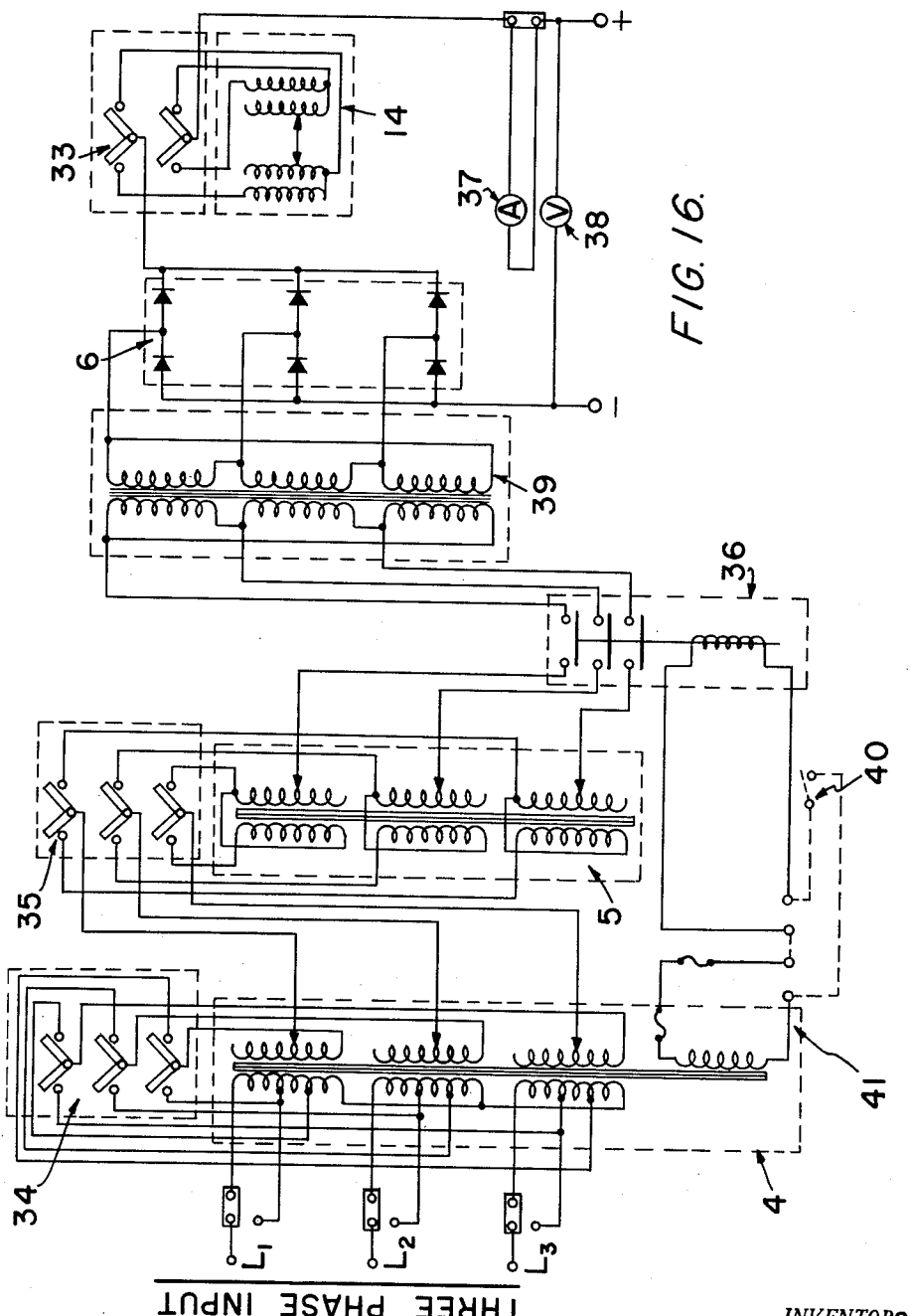

United States Patent Office

3,054,884
Patented Sept. 18, 1962

3,054,884
POWER SUPPLY FOR ELECTRIC WELDING
August F. Manz, Newark, N.J., Charles Hopkins, Salt Lake City, Utah, and De Wayne B. Peterson, Chappaqua, N.Y., assignors to Union Carbide Corporation, a corporation of New York
Filed Mar. 9, 1960, Ser. No. 13,760
10 Claims. (Cl. 219—131)

This invention relates to electric welding and more particularly to a power supply system which can be adjusted to supply welding power for any direct current electric arc welding process, as for example, consumable electrode electric arc welding wherein a consumable wire is mechanically fed to a welding arc formed between the wire electrode and the work and metal from such electrode is transferred to such work by short-circuiting type metal transfer.

As is well known in the art, the type power supply and the particular settings of a power supply have always been a major factor in obtaining good welds. With the advent of the Sigma spray arc welding process and with the short-circuiting type metal transfer process, power supplies have become even more critical to the welding process.

Short circuiting type metal transfer occurs in quasi-arc welding where a consumable electrode is fed into the arc zone at a rate which causes the electrode to touch the weld puddle and create an electrical short circuit. During the short-circuit period, forces are developed which separate the electrode from the weld puddle by a "fuse" action. This "fuse" action recreates an arc gap between the electrode and weld puddle allowing a new arc to be established. These events are repeated in rapid succession, thereby creating a repetitive short-circuiting welding condition.

In order to control the repetitive short-circuiting welding conditions to produce a more stable and controllable arc, it was found necessary to use a power supply with a controlled static volt-ampere slope characteristic. Such power supplies tend to control the current build-up on short circuiting while preventing excessive current which blasts out metal from the electrode and weld pool, disrupts the arc, produces uneven penetration, and poor bead formation. Many power supplies with controlled static volt-ampere slopes are commercially available for use with this type of metal transfer.

Experiments have demonstrated that constant potential, conventional, and the "rising" characteristic power supplies can be used to more advantage for short-circuiting type of metal transfer provided an inductive reactance is placed in the welding circuit. As a case in point, a Westinghouse 500 RCP power supply by itself is unsatisfactory for this type of welding of aluminum. However, the addition of a Westinghouse dynamic reactor to the welding circuit makes it possible to obtain welds on 0.090 inch or heavier aluminum plate. This is so because the dynamic reactor effectively limits the circuit time constant to values usable with short-circuiting type metal transfer. In addition, the reactance reduced spatter which would otherwise occur.

Welds made with these or similar power supplies are satisfactory for most applications. Yet, certain characteristics associated with weld puddle fluidity are not entirely satisfactory. A common complaint of manual welders is that the arc is unstable. Some other complaints are prominent puddle freeze lines, cold laps, poor edge coalescence, and too little penetration. It became apparent that the prior degree of control over the energy distribution in a short-circuiting cycle was inadequate.

Welding conditions necessary to make a particular weld are highly subjective. While almost every operator will pick conditions that fall in the same general range for a welding job, almost every operator will have a different preference for the fine control necessary to achieve the results he desires.

Up to the present time there has not been available a power supply which is universally applicable to any welding setup. This invention provides such a power supply. For example, by making adjustments to the inventive power supply as described hereinafter, a welding operator can utilize such power supply for tungsten-inert-gas shielded welding, metal-arc-gas shielded welding or short-circuiting type metal transfer quasi-arc welding. As a further example, in short-circuiting type metal transfer, by making similar adjustments, a welding operator can control weld puddle fluidity, penetration, spatter, etc., without changing any other process variable.

It is an object of the present invention to provide a D.C. welding power supply which has universal arc and quasi-arc welding applications.

Another object is to provide a D.C. welding power supply especially suited for short-circuiting type metal transfer welding.

Other objects are:

(1) To achieve the unexpected result of being able to control the energy distribution in short-circuiting type welding without changing any of the apparatus adjustments (feed rate, gas, travel, etc.).

(2) To obtain control over the weld puddle fluidity which permits an operator to select the degree of fluidity best suiting the welding application.

(3) To obtain control over the weld bead "freeze lines" such that weld beads can range from those with no visible freeze lines to those exhibiting prominently visible freeze lines.

(4) To obtain control over the penetration.

(5) To obtain additional control of spatter.

(6) To obtain additional control over the short-circuit repetition frequency.

(7) To obtain additional control of puddle agitation.

Still other objects are to provide equipment which permits less skilled operators to make skillful welds and to provide a power supply which extends the current density operating range of a particular wire electrode and/or shielding gas.

These and other objects and advantages of the invention will be pointed out or will become apparent from the following description of the invention.

In accordance with the present invention, the aforesaid objects are obtained by utilizing a novel welding circuit including a D.C. welding power supply having means for varying the static volt-ampere characteristic and for coarsely setting the time constant of the circuit and having a variable D.C. reactor to finely control the critical final value of said time constant, such D.C. reactor providing means for correlating the final circuit time constant with the slope of the static volt-ampere characteristic for thereby obtaining the desired welding condition for a particular welding job.

The invention also provides an improved welding process which comprises connecting in welding circuit relation with a consumable electrode, and a workpiece to be welded, a D.C. welding power source having variable means for selecting a desired static volt-ampere characteristic and coarsely setting the time constant of the circuit and having a variable D.C. inductive reactance to control the critical final value of said time constant; initiating the welding operation by feeding the consumable electrode toward such workpiece to make electrical contact therewith; adjusting the variable means to select a volt-ampere characteristic curve having a slope such that a controlled value of short-circuit current is derived from said power supply and to coarsely set the time constant of the welding circuit; and adjusting the value of the D.C. inductive reactance to establish a critical final value of the time constant of the welding circuit for thereby obtaining improved control of welding conditions.

For a complete understanding of the invention reference should be made to the following detailed description and the accompanying drawings in which:

FIG. 1A is a block diagram of a typical power supply capable of delivering a variable slope static volt-ampere characteristic curve;

FIG. 1B is a similar diagram of a modification of the power supply;

FIGS. 5 and 6 are oscillograph traces of current vs. time during actual welding operations and illustrate the effect of different final circuit time constants;

FIGS. 7, 7a, 8, 8a, 9, 9a, 10 and 10a are photographs of plan views and cross-sections, respectively, of actual welds and the effect thereon of varying the final circuit time constant;

FIG. 16 is a schematic wiring diagram of a specific embodiment of the invention.

This invention is predicated on the fact that if a D.C. power source is provided with variable means for selecting a desired static volt-ampere curve and with a variable D.C. reactor for controlling the time constant and therefore rate of change of current (speed of response) of the power source, a new and unusual power source is obtained which can be "tuned" finely to any particular welding conditions by making interdependent adjustments to such means for selecting the static volt-ampere curves and to such variable D.C. reactor for controlling the final time constant.

It is to be understood that for the purpose of this invention the word "variable" includes incrementally variable and/or continuously variable. Also, the word "tuned" is used in the sense of tuning welding conditions to suit the operator.

For the purposes of clarity and explanation, the inventive power supply will be discussed in connection with the short-circuiting type metal transfer welding process. However, this is for descriptive purposes only and is not intended as limitation on the inventive concept disclosed herein, such limitation and scope of invention being set forth and defined by the claims.

Short-circuiting type metal transfer quasi-arc welding requires a "controlled" short-circuit current. Such a controlled short-circuit current is one whose rate of change from arcing current to short-circuit current and magnitude thereof is adjustable. The rate of change of current in the welding circuit is controlled by the circuit time constant. This time constant depends on the total circuit reactance and resistance and is varied by changing either. However, when resistance is used to vary the time constant changes also occur in the magnitude of the short-circuit current. Therefore, reactance change is preferred, instead of resistance change, to keep the time constant change relatively independent of the final short-circuit current magnitude.

Figure 2:
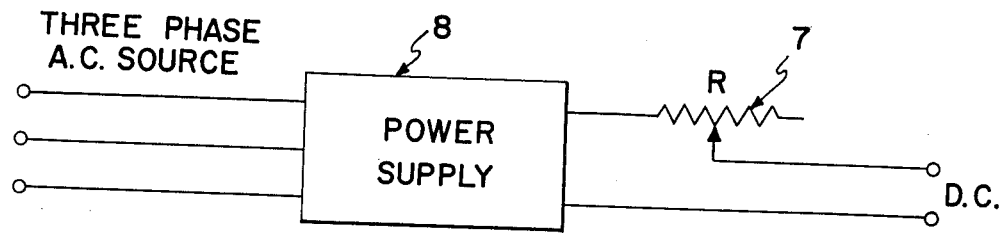
FIG. 2 is a circuit diagram of a modification wherein a variable resistance is utilized to further control the static volt-ampere characteristic curve.

The short-circuit current magnitude is controlled by the static volt-ampere slope setting of the power source. This static volt-ampere slope can be obtained in several ways. In transformer-rectifier power supplies the most common way is the introduce an inductive reactance in the welding transformer circuit before the rectifier. FIG. 1A shows such a typical power supply with a three-phase inductance reactance 1 inserted before a three-phase constant potential transformer 2 supplying a three-phase full-wave rectifier 3 such that it provides the proper welding current and voltage. As a result of increasing the value of reactance 1, the static volt-ampere slope of the power supply is increased and the short-circuit current is decreased (see FIG. 12). The combination of transformer 4, reactor 5, and rectifier 6 in FIG. 1B acts in a similar manner to the combination of similar elements 1, 2 and 3 in FIG. 1A. It is to be noted that FIG. 1B shows the transformer before the reactor. Slope can also be obtained by adding a variable resistance 7 in the D.C. welding circuit of a power supply 8 as indicated in FIG. 2.

Figure 3:
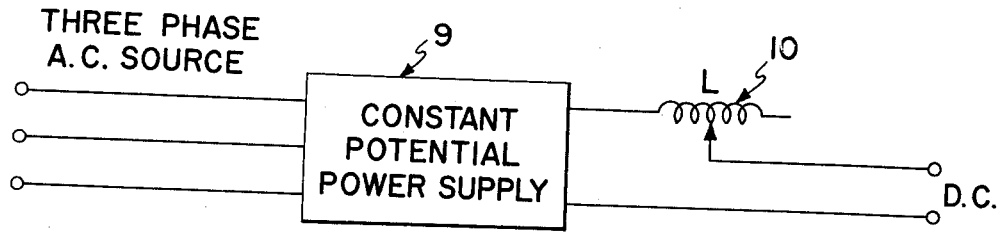
FIG. 3 is a similar diagram of another modification of the power supply in either FIG. 1A or FIG. 1B wherein a variable D.C. inductance is utilized to control the total time constant of the welding circuit.

Any of the above methods for obtaining the desired slope in addition to fixing the magnitude of the short-circuit current coarsely sets a circuit time constant. The circuit time constant controls the rate of change of current along the selected volt-ampere curve. Rate of change of current is critical to achieve good welds, especially in short-circuit type metal transfer welding. Critical fine tuning of the circuit time constant to produce the rate of current change best suited to a job is achieved by adjusting the reactor of the D.C. welding circuit without changing the final short-circuit current magnitude. For example, referring to FIG. 3, the slope of the volt-ampere curve of the power supply 9 first is fixed by selecting a proper value of reactance in the A.C. circuit. This automatically fixes the magnitude of the short-circuit current and partially fixes the total circuit time constant. A variable inductive reactance 10 connected in the D.C. circuit is adjusted to further refine the circuit time constant and thus fix the final value of the circuit time constant without changing the final magnitude of short-circuit current.

Figure 4:
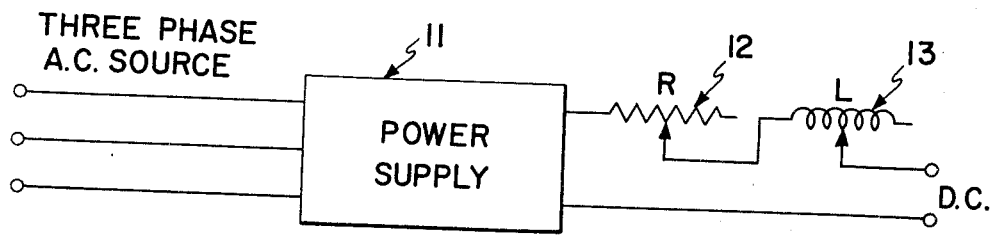
FIG. 4 is a circuit diagram of the preferred embodiment of the invention.
Figure 8A:

A preferred embodiment of the present invention is illustrated in FIG. 4. In this embodiment the power supply 11 includes a variable reactor on the A.C. side of said power supply, for example as shown in either FIG. 1A or 1B, for controlling the slope, and a variable resistance 12 in the D.C. welding circuit for providing a finer degree of control over the slope. A variable inductive reactance 13 is also connected in the D.C. circuit for changing the final circuit time constant and for providing means for correlating the value of this inductive D.C. reactance with the value of reactance in the A.C. circuit and resistance in the D.C. circuit to provide the welding conditions desired by a welding operator to perform a particular welding job, that is, to "tune" the circuit. Adjustments to the variable resistance 12 and the variable reactance 13 are necessarily independent of each other. It is to be noted that the resultant effect of resistance 12 in the D.C. circuit can, in a substantially like manner, be provided by placing a suitable resistance in the A.C. circuit. On the other hand, reactance 13 cannot be removed from the D.C. circuit and yet be expected to produce similar results, because it will no longer change the time constant without affecting the final short-circuit current.

It is recognized that power supplies operating on other than three-phase sources can work, as well as motor-generators, etc. The only requirement is that the basic power supply provide direct current for welding.

Control of the circuit time constant is critical in the practice of this invention. The time constant influences the short-circuiting period and the arcing period is short-circuiting type metal transfer welding.

The oscillographic traces in FIGS. 5 and 6 show current vs. time during actual welding operations where the average voltage and current are the same magnitude for both traces. The value of the time constant is smaller in FIG. 5. It is apparent that the maximum instantaneous value of current in FIG. 5 is greater than that of FIG. 6. As a consequence, the short-circuit period in FIG. 5 is smaller than that in FIG. 6. Furthermore, due to a larger time constant, the current in FIG. 6 is sustained at a higher level during most of the arcing period as compared with FIG. 5. Thereby an effectively higher electrical input is created during the arcing period. As a result of this entire redistribution of the total electrical input, a greater control of puddle fluidity exists and a high degree of welding control results. Examples of these differences in completed welds obtained by merely tuning the power supply differently are shown in FIGS. 7, 7a, 8 and 8a. These welds were made under the conditions described in Table I, with a welding set-up similar to that illustrated in FIG. 11. It will be noted that the weld in FIG. 7 exhibits shallower penetration, more prominent freeze lines, poor wetting action and more spatter as compared with FIG. 8.

TABLE I

Figure 7A:
Figure 7:
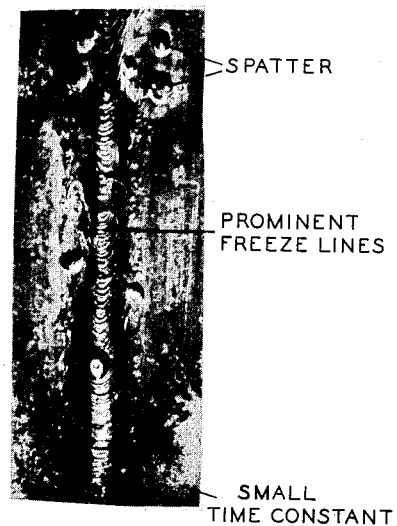
Figure 8:
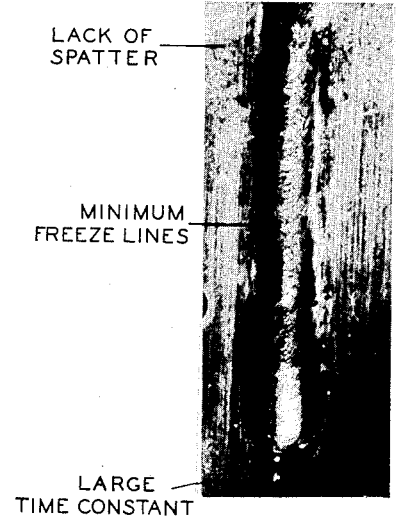

*Mechanized Welding Conditions for Bead-on-Plate Welds in FIGS. 7 and 8*

Torch—Linde ST-2 described in U.S. Patent No. 2,952,766.
Wire—0.030 inch diameter wire consisting of .06 C; 1 to 1.4 Mn; .40 to .60 Si; .03 max. S; .03 max. P; .05 to .15 Al; .02 to 0.12 Fr; .05 to 0.15 Ti; and balance Fe.
Feed rate—240 i.p.m.
Shielding—15 c.f.h., 75% A, 25% $CO_2$.
Travel—24-25 i.p.m.
Tip-to-work—5/16 inch.
Plate—1020 cold rolled steel, 1/8 inch thick.
Average voltage—19 volts.
Average current—115 amperes.

Figure 11:
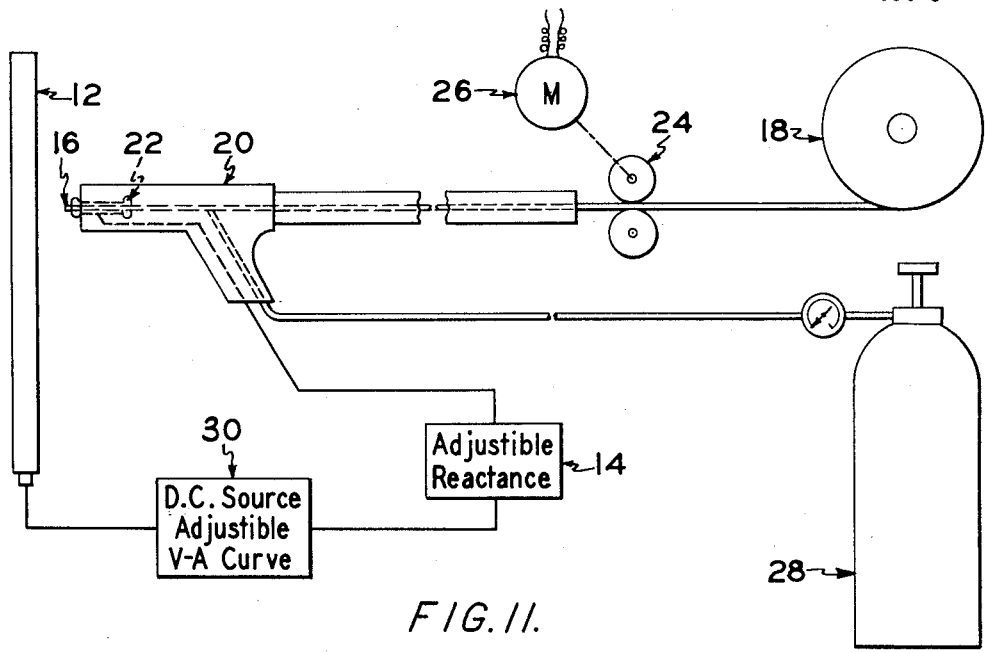
FIG. 11 is a block diagram of the inventive power supply in a complete, operable system.

Referring now to FIG. 11, a D.C. power source 30 provided with internal variable means such as a sliding reactor or magnetic amplifier, for adjusting the volt-ampere curve and having associated therewith a variable D.C. reactor 14 such as an air gap type reactor, is connected on one side to contact element 22 in torch 20, and on the other side to workpiece 32. The wire electrode 16 is drawn by feed rolls 24 from a wire source 18 to torch 20. Current is introduced to electrode 16 through contact element 22. Feed rolls 24 are driven by a motor 26. Shielding gas is supplied to torch 20 from a suitable source such as a compressed gas cylinder 28. FIG. 16 provides a typical schematic wiring diagram of D.C. power source 30 shown in block form in FIG. 11 and which is broken up into the three major components as shown in block form in FIG. 1B.

In FIG. 16 a three-phase variable transformer 4 is connected to a range switch 34 for adjusting the open circuit voltage. The output of such transformer 4 is connected to a variable A.C. reactor 5 and an A.C. reactor range switch 35 to obtain an adjustable static volt-ampere characteristic. A main contactor 36 connects A.C. variable reactor 5 with main transformer 39. Such transformer provides three-phase power for the full-wave bridge rectifier 6. Rectifier 6, in turn, has the D.C. output thereof connected to a D.C. reactor 14 and D.C. reactor range switch 33. Upon closing of main contactor switch 40, auxiliary power circuit 41 provides operating power for the main contactor 36. Ammeter 37 and voltmeter 38 are appropriately connected at the output terminals of the power supply.

In order to "tune" the power supply to the welding conditions desired, the welding operator while making a test weld adjusts the variable sliding A.C. reactor 5 until the power source is delivering the desired volt-ampere characteristic curve and also adjusts the D.C. reactor 14 until the power supply is "tuned" to suit him.

Figure 12:
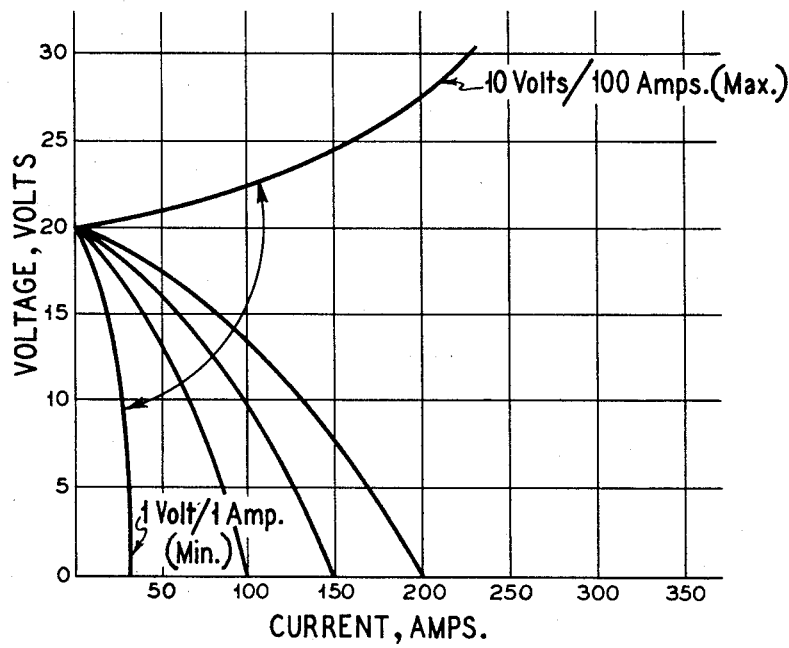
FIG. 12 is a graph illustrating the range of slopes obtainable with the novel power supply.
Figure 13:
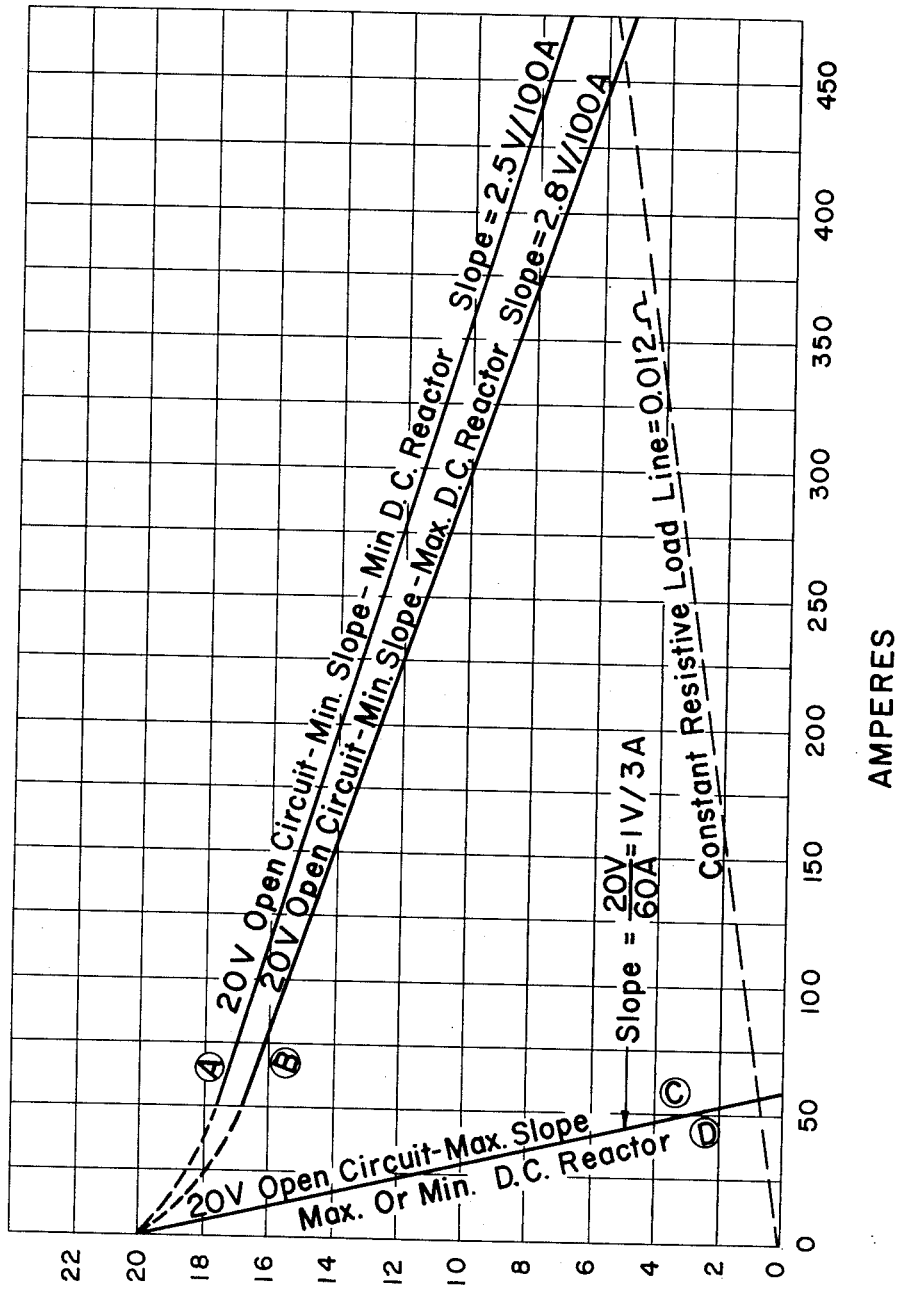
FIG. 13 is a graph illustrating the range of slopes obtainable with a specific embodiment of the inventive power supply.

In the broadest aspects of the invention, utilizing variable means such as a sliding A.C. reactor or magnetic amplifier for adjusting the volt-ampere curve of the power supply, any slope from a minimum of about 1 v./1 a. drop to maximum of about 10 v./100 a. rise may be obtained (see FIG. 12). The range of slopes obtainable with the power supply shown in FIG. 16 is illustrated in FIG. 13. The slope selected for a particular welding job is determined empirically. Once the desired slope is selected, the time constant and therefore rate of change of current of the circuit is finely fixed by making appropriate adjustments to the variable D.C. reactor 14. The time constant so-fixed influences the rate of change of current along the volt-ampere curve previously selected. This affects the short circuit and arc period (see FIGS. 5 and 6) which affects the distribution of energy to the weld.

Figure 14:
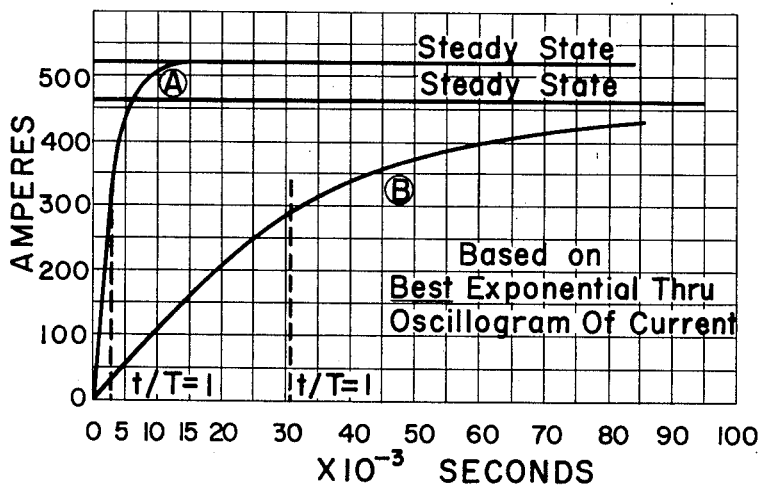
FIGS. 14 and 15 are graphs showing the effect of changing time constant for the slopes shown in FIG. 13.
Figure 15:
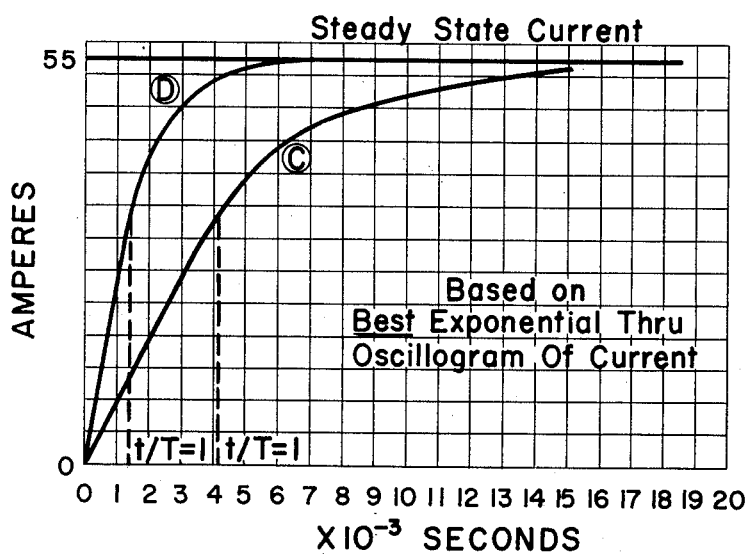

The advantages achieved by control of the circuit time constant are clearly indicated by FIGS. 13, 14 and 15. FIG. 13 shows the range of static volt-ampere curves obtainable with the power supply described and illustrated in FIG. 16 with the open circuit voltage arbitrarily selected to be 20 volts. The curve marked "A" is obtained from such power supply when the variable A.C. reactor 5 is adjusted to a minimum value and variable D.C. reactor 14 is adjusted to a minimum value. Curve "B" is obtained when the A.C. reactor 5 is at a minimum value and D.C. reactor 14 is adjusted to a maximum value. Thus, curves "A" and "B" have essentially the same slope. The slight change (3 volts/1000 amp.) resulting when changing the value of variable D.C. reactor 14 from a minimum to a maximum value is due to the inherent resistance of the reactor windings. On the other hand, the marked difference in the time it takes to reach steady state conditions when operating on curves A and B is brought out by FIG. 14, which shows the rise in load current vs. time based on the best exponential curve drawn through the actual oscillograph of current vs. time. It is obvious from these curves that curve A reaches steady state much more rapidly than curve B and that the time constant indicated at $t/T=1$ is small, $T=2.78 \times 10^{-3}$, compared to the time constant, $$T = 30.50 \times 10^{-3}$$

for curve B.

Referring this information back to FIGS. 5 and 6, it will be noticed that when welding on curve A with a small time constant, see FIG. 5, the energy is not sustained at as high an energy level as compared with curve B with a larger time constant, see FIG. 6. Thus, if the operator desires a cold weld, that is, a weld puddle which freezes fairly rapidly, he would work on curve A. If he desired more puddle fluidity, he would select curve B with a larger time constant.

In a like manner, the curves marked "C" and "D" in FIG. 13 indicate the maximum slope obtainable with the power supply shown in FIG. 16; that is, the slope obtained with A.C. variable reactor 5 adjusted to a maximum. Curve C is obtained with D.C. reactor 14 adjusted to maximum value and curve D is obtained with D.C. reactor 14 adjusted to a minimum value. In this case there is no appreciable change in slope when adding the reactance. FIG. 15 illustrates the marked difference in time it takes to reach steady state conditions when operating on curves C and D.

In this case the time constant T for curve D is small, $T=1.39 \times 10^{-3}$ sec., as compared to curve C where $T=4.16 \times 10^{-3}$ sec., as read from the curve at $t/T=1$.

From these curves and the data summarized below, it is obvious that by adjusting the variable A.C. reactor 5 and the variable D.C. reactor 14, a continuously variable time constant T may be obtained, and hence, that the power supply may be "tuned" to the best possible welding conditions.

Table A summarizes the data in FIGS. 13, 14 and 15 wherein:

$T = L/R$ in seconds;
$L =$ total circuit inductance in henries; and
$R =$ volt-ampere slope of power supply plus the resistance load of the cables and contacts of the welding equipment, in ohms.

TABLE A

| Slope | R | L | T |
|---|---|---|---|
| A | 0.037 | $103 \times 10^{-6}$ | $2.78 \times 10^{-3}$ |
| B | 0.040 | $1,200 \times 10^{-6}$ | $30.50 \times 10^{-3}$ |
| C | 0.345 | $1,450 \times 10^{-6}$ | $4.16 \times 10^{-3}$ |
| D | 0.345 | $480 \times 10^{-6}$ | $1.39 \times 10^{-3}$ |

From Table A, it is apparent that:

$$L_B - L_A = L_C - L_D \pm 10 \text{ percent}$$

This indicates within justifiable experimental limits that the D.C. variable reactance for the power supply shown in FIG. 16 is variable from 0 to 1000 microhenries. A designed range of from $L$ total $= 20 \times 10^{-6}$ henries to $L$ total $= 2000 \times 10^{-6}$ henries has been found to be the most practical design range of inductance. It should be noted, however, that if a C.P. power source having minimum A.C. reactance is employed, a variable D.C. reactor having a maximum value of 2000 microhenries is necessary to fall within the practical design range for L total.

Other advantages of the invention are brought out by the following example.

Two welds were made with afore-described set-up of FIG. 11 under the welding conditions given in Table II below. The first weld, shown in FIGS. 9a and 9, was made with the variable inductor set to provide a calculated circuit inductance value of 177.5 microhenries, which resulted from a measured circuit time constant of about $5.5 \times 10^{-3}$ sec. and a calculated "fuse" period of $7.75 \times 10^{-3}$ sec. In making the next weld (see FIGS. 10a and 10) everything was held constant while the D.C. inductor was adjusted to provide a calculated circuit inductance value of 452 microhenries to give a measured time constant of $14.0 \times 10^{-3}$ sec. and a calculated "fuse" period of $12.3 \times 10^{-3}$ sec. The difference in weld penetration and weld appearance is obvious from the photographs. The example illustrates the wide variation in welding conditions obtainable by adjusting the value of D.C. inductance to change the total time constant.

TABLE II

*Mechanized Welding Conditions for Bead-on-Plate Welds in FIGS. 9 and 10*

Torch—HW-13 modified described in U.S. Patent No. 2,754,395.
Wire—0.030 inch diameter wire consisting of .07 C; .50 Mn; .02 P; .02 S; .30 Si; 15.10 Cr; 2.25 Mo; 1.17 Al; and balance Fe.
Current density—$920 \times 10^3$ a./sq. in.
Feed rate—276 i.p.m.
Shielding—20 c.f.h., 99% A, 1% $O_2$.
Travel—12.5 i.p.m.
Tip-to-work—5/16 inch.
Plate—18–8 stainless steel, 1/8 inch.
Average voltage—18.5–19 volts.
Average current—90 amperes.
Resistance—0.0323 ohm.
Open circuit voltage—21 volts.

Table III provides a further example of the value of a variable speed of response power supply. By "tuning" it is possible to extend the range of a particular welding set-up. Referring to Table III, by using the power supply of the invention, current densities as low as 25,000 a./in.$^2$ can be obtained with 1/16 inch aluminum wire. Selection of the proper time constant is critical. A change of inductance on the order of 10 percent is sufficient to disrupt the welding conditions.

TABLE III

*Example of Extension of Current-Voltage Operating Range*

Torch—HW-11 described in U.S. Patent No. 2,952,766.
Wire diameter—1/16 inch aluminum.
Shielding—40 c.f.h. argon, No. 10 cup.
Tip-to-work—1/2 inch approximately.
Metal transfers per second—30 or greater.

| | Before | After |
|---|---|---|
| Minimum Usable Current Density | 40,000 a./in.$^2$ | 25,000 a./in.$^2$ |
| Time Constant | "Basic Power Supply" | "Tuned In." |

It will be evident that as a result of this invention it has been made possible for welding operators to select the welding conditions best suited to their skills and to the job to be done without the necessity of adjusting numerous variables. It is to be understood that the invention is not limited to the particular embodiments disclosed herein, but may be used in other ways without departure from its spirit and scope so defined by the following claims.

We claim:

1. Electric arc power supply apparatus comprising a D.C. power source for supplying welding power to a welding circuit including a workpiece and an electrode, adjusting means associated with said power source for selectively deriving therefrom a static volt-ampere characteristic curve having a slope in the range of from about 1 v./1 a. drop up to about 10 v./100 a. rise so as to control the magnitude of short-circuit current and for coarsely setting such welding circuit time constant, and a selectively variable impedance associated with said power source for finely controlling the final critical value of the circuit time constant and such impedance providing means for correlating said final circuit time constant with the slope of said static volt-ampere characteristic curve whereby improved control of welding conditions is obtained.

2. A power supply circuit system for electric arc welding comprising a transformer; means connected in circuit relation with said transformer for selectively deriving from said transformer a static volt-ampere characteristic curve having a slope in the range of from about 1 v./1 a. drop up to about 10 v./100 a. rise so as to control the magnitude of short-circuit current and for coarsely setting the time constant of said circuit, rectifier means in said circuit for rectifying the A.C. voltage to a D.C. welding voltage, a selectively variable reactor connected in the D.C. side of said rectifier means for finely controlling the critical final value of the time constant of said circuit, said D.C. reactor providing means for correlating said circuit time constant with the slope of said static volt-ampere characteristic curve whereby improved control of welding conditions is obtained.

3. A power supply circuit system according to claim 2, wherein said means connected in circuit relation with said transformer for selectively deriving from said transformer a static volt-ampere characteristic curve having a slope in the range of from about 1 v./1 a. drop up to about 10 v./100 a. rise so as to control the magnitude of short-circuit current and for coarsely setting the time constant of said circuit is an A.C. variable reactor.

4. A power supply circuit system according to claim 3, wherein said D.C. reactor is variable from about 0 to 1000 microhenries.

5. A power supply circuit system according to claim 1, wherein the total circuit inductance may be varied from about $20 \times 10^{-6}$ henries to $2000 \times 10^{-6}$ henries.

6. An electric arc welding system for short-circuiting type metal transfer arc welding which comprises, in combination, a D.C. welding power supply of the transformer-rectifier type connected in circuit relation with a consumable electrode welding torch and a workpiece, variable means in the transformer circuit of said power supply for selectively establishing the general slope of the static volt-ampere characteristic curve derived from such supply and for coarsely setting the time constant of said circuit, a resistor in circuit with said rectifier providing a fine control for establishing the specific slope of said volt-ampere characteristic curve, a selectively variable D.C. inductor in the output circuit of said D.C. supply for finely controlling the critical value of the time constant of said circuit, said D.C. reactor providing means for correlating such critical final value of the time constant with the specific slope of said static volt-ampere characteristic curve whereby improved control of welding conditions is obtained.

7. A method for short-circut type metal transfer welding which comprises providing a welding circuit including a D.C. welding power supply having variable means for establishing the slope of the static volt-ampere curve derived from such power supply and for coarsely setting the time constant of said welding circuit, a selectively variable D.C. reactor associated with said power supply for finely fixing the critical final value of said circuit time constant and for providing means for correlating the time constant of such circuit with the slope of the static volt-ampere curve derived from such power supply, a consumable electrode connected to one terminal of said D.C. power supply, and a workpiece connected to the other terminal of said D.C. power supply; feeding said consumable electrode toward such workpiece to cause said electrode to make electrical contact with said workpiece to initiate the flow of current in said welding circuit and to initiate said short-circuiting type metal transfer from said electrode to said workpiece; changing the value of said variable means in said power supply to establish the desired slope of the static volt-ampere characteristic curve and to coarsely set the time constant of said welding circuit; adjusting the value of said D.C. reactor associated with said power supply to finely control the critical final value of the time constant of said welding circuit, and to correlate the value of said D.C. reactor with respect to the slope of the static volt-ampere curve to control the rate of change of current along such curve for said short-circuit type metal transfer whereby improved control of welding conditions is obtained.

8. A power supply according to claim 2, wherein said D.C. reactor is variable from about 0 to 2000 microhenries.

9. A method for obtaining the exact electrical welding conditions necessary for making satisfactory welds in any type of arc welding process which comprises connecting a D.C. power source in a welding circuit including a workpiece and an electrode, said D.C. power source having variable means for establishing the slope of the static volt-ampere curve derived from such power source and for coarsely setting the time constant of said welding circuit, a selectively variable D.C. reactor associated with said power source for finely fixing the critical final value of said circuit time constant and for providing means for correlating the time constant of such circuit with the slope of the static volt-ampere curve derived from such power source; striking a welding arc between said electrode and workpiece; changing the value of said variable means in said power source to establish the desired slope of the static volt-ampere characteristic curve and to coarsely set the time constant of said welding circuit; adjusting the value of said D.C. reactor associated with said power source to finely control the critical final value of the time constant of said welding circuit, and to correlate the value of said D.C. reactor with respect to the slope of the static volt-ampere curve to control the rate of change of current along such curve whereby improved control of arc welding conditions is obtained.

10. A method for providing any combination of static volt-ampere characteristics and final circuit time constant from an electric power source for use in a direct current electric arc welding process, said source having means for adjusting the slope of the static volt-ampere characteristics and for coarsely setting a circuit time constant comprising (a) providing a selectively variable inductance in the D.C. circuit of said source;

(b) selecting an open-circuit voltage on said power supply to set the origin of the static volt-ampere characteristic;

(c) adjusting the slope of the static volt-ampere characteristic to thereby set the magnitude of the short-circuit current desired and the combination of steps (b) and (c) coarsely setting the final circuit time constant desired;

(d) and then selecting a value of inductance from said selectively variable inductance to finally set the circuit time constant without affecting the slope of the static volt-ampere curve selected whereby the power source may be set to deliver electric power suited to the requirements of any arc welding process.

References Cited in the file of this patent

UNITED STATES PATENTS

| | | |
|---|---|---|
| 2,734,981 | Bischel et al. | Feb. 14, 1956 |
| 2,752,529 | Croco et al. | June 26, 1956 |
| 2,825,004 | Rebuffoni et al. | Feb. 5, 1958 |
| 2,873,356 | Carroll et al. | Feb. 10, 1959 |
| 2,909,647 | Glenn et al. | Oct. 20, 1959 |

FOREIGN PATENTS

| | | |
|---|---|---|
| 191,714 | Austria | Sept. 10, 1957 |